T. J. HOOVER.
APPARATUS FOR ORE CONCENTRATION.
APPLICATION FILED MAR. 17, 1909.
953,746.
Patented Apr. 5, 1910.
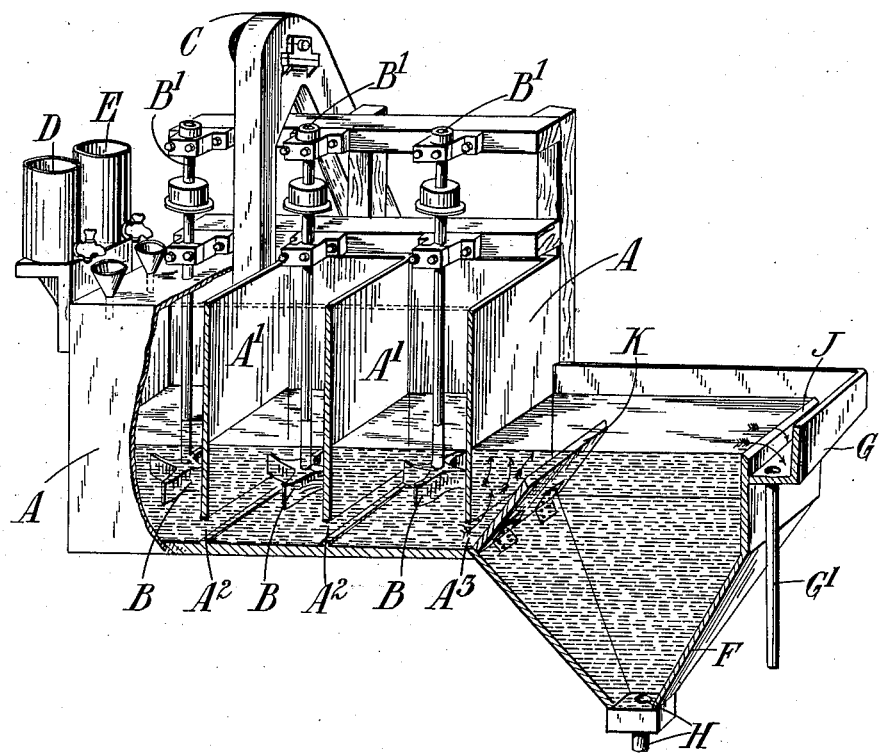

UNITED STATES PATENT OFFICE.

THEODORE JESSE HOOVER, OF LONDON, ENGLAND, ASSIGNOR TO MINERALS SEPARATION LIMITED, OF LONDON, ENGLAND.

APPARATUS FOR ORE CONCENTRATION.

953,746.      Specification of Letters Patent.      Patented Apr. 5, 1910.

Application filed March 17, 1909. Serial No. 483,971.

*To all whom it may concern:*

Be it known that I, THEODORE JESSE HOOVER, a citizen of the United States of America, residing at London, England, have invented certain new and useful Improvements in Apparatus for Ore Concentration, of which the following is a specification.

This invention relates to improvements in apparatus for ore-concentration.

Several processes are known in which air is beaten into a liquid containing powdered ore in suspension, whereupon the bubbles of air attach themselves to certain particles which are thereby caused to float, while other particles are not so floated.

The object of this invention is to improve the apparatus used in this type of process.

The invention is applicable to the process described in the United States patent of Sulman, Picard and Ballot, No. 835120, Nov. 6, 1906, in which the liquid wherein the ore is suspended contains a small proportion of oleic acid or other oil. The invention is also applicable to processes in which no oil is used.

When air is beaten into the liquid in which the ore is suspended after which the liquid is introduced into a settling vessel, the object is that the air bubbles rising to the surface of the liquid in the settling vessel should form a froth carrying the particles of metallic sulfids. In certain forms of apparatus hitherto used, a proportion of the air escaped out of the liquid or collected into large bubbles before the liquid was brought into the settling vessel, and some of the effective floating power of the air was therefore lost.

According to this invention, an apparatus for concentrating ores by gaseous flotation of certain mineral particles comprises the combination with an agitating vessel in which the liquid containing powdered ore in suspension is agitated so as to beat air into it, of a spitzkasten or like settling vessel placed immediately at the outlet of the agitation apparatus, whereby the air beaten into the liquid is most effectively used for the purpose of flotation.

Another feature of this invention consists in the employment in such an apparatus of a guide, such as a baffle or deflecting plate, arranged at the inlet of the settling vessel in such a way as to direct the stream of mineral particles and air-bubbles toward the surface of the liquid, whereby a particularly effective flotation froth is obtained.

The accompanying drawing is a diagram in perspective, illustrating one form of apparatus embodying this invention.

Several agitation vessels A are placed in series. These may conveniently be large vats separated by partitions $A^1$ having openings $A^2$ at the bottom so that the liquid may pass from one to another. Each vessel is provided with a rotatable stirrer B which is conveniently of the form shown in the drawing. Each stirrer is carried on a spindle $B^1$ rotated at a high speed by any convenient means.

Crushed ore or similar finely divided mineral is fed into the first vessel A through any convenient ore-feeding device such as C, and water is also fed into the vessel A. A small proportion of acid, such as sulfuric acid, may be introduced into the water from the feeding vessel D, and a small proportion of one or more other substances which enable metallic sulfids to be floated by air under the conditions hereafter specified, may be introduced from the feeding vessel E. The circuit-water may be cold or may be heated to any suitable temperature. The liquid containing ore in suspension is vigorously agitated in the agitation-vessels and escapes at the outlet $A^3$ highly charged with air.

A settling apparatus consisting of one or more spitzkasten F, is placed immediately at the outlet from the agitation apparatus. As shown in the drawing, the spitzkasten F has a launder G to receive the floating froth which passes away through the outlet $G^1$. The liquid and the sunken material pass out through the outlet H at the bottom of the spitzkasten. The level of the liquid in the spitzkasten is slightly above the lip J. Within the spitzkasten is placed an inclined baffle or guide-plate K, which may be made adjustable, extending upward from below the inlet $A^3$ and arranged to direct the stream of ore-particles and air-bubbles toward the surface of the liquid in the spitzkasten. The result of the use of this arrangement is that the liquid passes out of the agitation apparatus directly into the spitzkasten, whereupon the little bubbles of air rise to the surface carrying with them the mineral particles to which they are attached. The fact that the spitzkasten is placed immediately at the outlet of the agitation apparatus insures that practically all the air introduced into the liquid shall be utilized for flotation purposes and the position of the baffle K assists the air-bubbles in carrying the metallic sulfid particles to the surface while the gangue, which is not attached to the air-bubbles, falls when it passes over the top of the baffle. The liquid which passes out of the bottom of the spitzkasten may, in addition to gangue, contain some metallic sulfids and it may therefore be again submitted to agitation and settling in a similar apparatus.

What I claim as my invention and desire to secure by Letters Patent is:—

1. In an apparatus for concentrating ores by gaseous flotation of certain mineral particles in liquid, the combination of, an agitation vessel, a spitzkasten contiguous thereto, said vessel and spitzkasten adapted to contain circuit liquid, means for agitating the contents of the agitation vessel so as to beat air into the liquid, and a wall between the agitation vessel and the spitzkasten having a wide communication orifice below the level of the liquid in both vessels, said agitation vessel adapted to discharge substantially directly into the spitzkasten.

2. In an apparatus for concentrating ores by gaseous flotation of certain mineral particles in liquid, the combination of, an agitation vessel, a spitzkasten contiguous thereto, said vessel and spitzkasten adapted to contain circuit liquid, means for agitating the contents of the agitation vessel so as to beat air into the liquid, a wall between the agitation vessel and the spitzkasten having a wide communication orifice below the level of the liquid in both vessels, and an inclined guide plate in the spitzkasten extending from below the orifice upward toward the surface of the liquid to direct the stream of mineral particles and air bubbles toward the surface of the liquid.

3. In an apparatus for concentrating ores by gaseous flotation of certain mineral particles in liquid, the combination of, an agitation vessel, a spitzkasten contiguous thereto, said vessel and spitzkasten adapted to contain circuit liquid, means for feeding ore into the agitation vessel, means for feeding circuit liquid into the agitation vessel, a rotary agitator in the agitation vessel arranged to beat air into the liquid, and a wall between the agitation vessel and the spitzkasten having a wide communication orifice below the level of the liquid in both vessels, said agitation vessel adapted to discharge substantially directly into the spitzkasten.

4. In an apparatus for concentrating ores by gaseous flotation of certain mineral particles in liquid, the combination of, an agitation vessel, a spitzkasten contiguous thereto, said vessel and spitzkasten adapted to contain circuit liquid, means for feeding ore into the agitation vessel, means for feeding circuit liquid into the agitation vessel, a rotary agitator in the agitation vessel arranged to beat air into the liquid, a wall between the agitation vessel and the spitzkasten having a wide communication orifice below the level of the liquid in both vessels, and an inclined guide plate in the spitzkasten extending from below the orifice upward toward the surface of the liquid to direct the stream of mineral particles and air bubbles toward the surface of the liquid.

5. In an apparatus for concentrating ores by gaseous flotation of certain mineral particles in liquid, the combination of, an agitation vessel, a spitzkasten contiguous thereto, said vessel and spitzkasten adapted to contain circuit liquid, means for feeding ore into the agitation vessel, means for feeding circuit liquid into the agitation vessel, a rotary agitator in the agitation vessel arranged to beat air into the liquid, a wall between the agitation vessel and the spitzkasten having a wide communication orifice below the level of the liquid in both vessels, and an inclined adjustable guide plate in the spitzkasten extending from below the orifice upward toward the surface of the liquid to direct the stream of mineral particles and air bubbles toward the surface of the liquid.

In testimony whereof I have signed my name to this specification in the presence of two subscribing witnesses.

THEODORE JESSE HOOVER.

Witnesses:
H. D. JAMESON,
F. L. RAND.